Feb. 25, 1964 R. D. COOK ETAL 3,122,604
GROUND CLIP FOR ELECTRICAL OUTLET AND SWITCH BOXES
Original Filed Nov. 12, 1958

INVENTORS.
Raymond D. Cook
William A. Lang
BY Webb, Mackey & Burden
THEIR ATTORNEYS

United States Patent Office 3,122,604
Patented Feb. 25, 1964

3,122,604
GROUND CLIP FOR ELECTRICAL OUTLET AND SWITCH BOXES
Raymond D. Cook and William A. Lang, Pittsburgh, Pa., assignors to Steel City Electric Company, Pittsburgh, Pa., a corporation of Pennsylvania
Original application Nov. 12, 1958, Ser. No. 773,326, now Patent No. 3,021,581, dated Feb. 20, 1962. Divided and this application Apr. 13, 1961, Ser. No. 102,840
4 Claims. (Cl. 174—51)

The present application relates to clips, more particularly to a grounding clip for electrical outlet and switch boxes. The clip per se is separately disclosed and claimed in copending application Serial No. 773,326, filed November 12, 1958, now Patent No. 3,021,581, of which this application is a division addressed to the combination and method of assembly of electrical components including the clip.

A growing requirement of local building codes has been that switch and outlet boxes installed in homes or public buildings be grounded by connecting them to a ground wire which is built into conductor cables of the type now used for wiring homes. Heretofore, it has been the practice for electricians installing the boxes to wrap the ground wire with one or two twists around a screw used in holding the box together and then to tighten the screw. This practice is no longer permitted under many building codes because the screws are generally on the outside of the boxes and the ground connection cannot be inspected after the boxes have been plastered in.

One solution to the problem has been to make further use of the usual clamp screw provided inside the box in conventional way to hold down the built-in cable clamp at the point where the cable is led into the box. This screw is thus made to hold an additional twist or two of ground wire under its head but, as the insulating composition on the lead-in cable shrinks with age, the clamp gradually relaxes under the screw and the ground wire loosens and loses its effectiveness vital to good contact. Another solution is for the manufacturer to provide an extra screw inside the box to which the ground wire can be connected. This increases the cost of the box and considerable time is required to secure the ground wire to the screw.

The present clip which we provide forms a frictionally secured, quick attachment connection for clamping a straight length of bare ground wire directly to the inside wall of the switch box or outlet box to be grounded. The positively developed clamping pressure directed against the straight length of wire provides a solid ground connection path that is augmented to a certain extent by the metal of the clip itself which is in direct contact with both the bare wire and the box surface to be grounded. In tests, the connection between the wire and the box showed a voltage drop well below the standard prescribed by the Underwriters' Laboratories, i.e., 10 millivolts @ 30 amperes.

Preferably, this clip is made in one piece of spring steel bent into a U-shape, which is then cadmium, zinc, or otherwise plated, and thereafter heat treated to impart the proper degree of hardness and spring tension. The clip is placed over the top edge of a box and provided with a longitudinally extending corrugation such that, when forced into position with a special tool or with a pair of pliers as convenient, it holds a straight length of the wire under substantially evenly distributed line contact with the box.

The present clips can be made at very low price. They are quickly and easily installed and can be used on a variety of switch and outlet boxes. In cases where two or more ground wires are connected to one outlet box, it has been the past practice to twist the wires together, solder them, and then fasten one of the wires to a screw or bolt on the outlet box. Obviously, it is far simpler to use two of the clips according to our invention, one for each ground wire. This feature is particularly useful in cases where the wires are of different metals and have to be separated to prevent electrolytic deterioration.

We have shown a preferred embodiment of our invention in the accompanying drawing in which.

Figure 4:
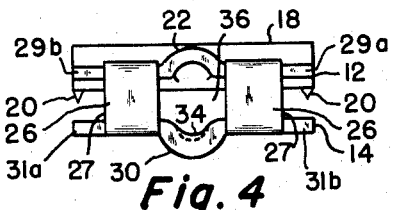
FIGURE 4 is a view in end elevation in the direction indicated by lines IV—IV of FIGURE 1.

More particularly, in FIGURES 1-5 of the drawing, we provide a one-piece clip 10 made of bent spring steel material of generally U shape and having a pair of legs 12 and 14, one for direct attachment to the wall of a device to be grounded. This attachment leg 12 has a transversely aligned pair of sheared edges 16 and is turned along a straight transverse bend line adjacent its unitary free end to form a reentrant-angled juncture with a ramp 18 and presenting thereat an inturned pair of sharp-cornered barbs 20. A conical corrugation 22 is pressed 1/32" outwardly from the plane of the top portion of the leg 12.

A pair of right angle bent spring arms 24 which lie parallel to one another have a substantially straight center section 26 and form an integral juncture between the legs 12 and 14. The spring arms 24 are relieved by notches 27 at their outer edges and are divided by a slot 28 punched equidistant therebetween; they rejoin at a point a short distance past their right angle bends where they merge with the corresponding attachment leg 12 and clamping leg 14 to form the mutually aligned tool shoulders indicated at 29a and 29b and at 31a and 31b respectively.

The clamping leg 14 is longitudinally corrugated with a corrugation 30 which forms a semicylindrical saddle bent on a curve (0.0325" inside radius) substantially conforming to the nominal radius of the wire to be clamped and disposed equidistant from the side edges of the leg 14. This corrugation 30 is pressed outwardly in transverse depth slightly more than one-half of the wire thickness and thus snugly rides the wire when the clip is installed to keep it squarely centered on a straight length of that wire. The inside surface of the corrugation is burred in at least one point to improve its positive electrical contact with the wire to be clamped, and a minor die blow preferably at the upper outer corner of the corrugation deflects the upper end portion of the latter at the right diagonal angle to produce the sharp-cornered burr 34 desired. The end of the cylindrical corrugation 30 aligns with the end of the conical corrugation 22 to form a pair of tool shoulders.

The side edges of the leg 14 are relieved at transversely aligned points with semicircular notches 31 through the margin and, at the free end, the leg 14 is formed with a trapezoidally-shaped center slot 32. This free end of the leg 14 is transversely turned to form a diagonally extending ramp 33 bisected by the slot 32. The straight edges of the slot 32 form a guide extension to hold a captive length of wire from sliding sideways from under the corrugation 30, and the slot 28 at the other end of the corrugation 30 is in an aligned arrangement with the slot 32 and with the corrugations 22 and 30 and defines an opening 36 (end elevational view of FIGURE 4) for threading the wire.

Figure 6:
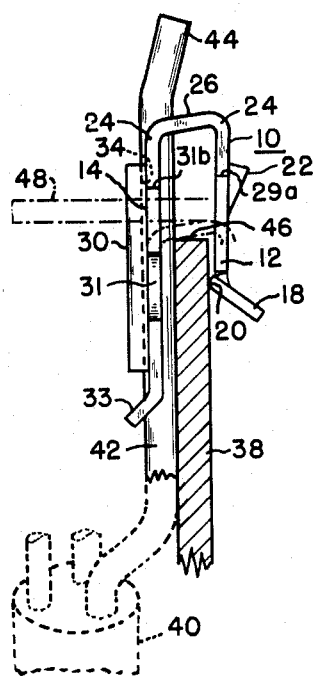
FIGURES 6 and 7 are side elevational and rear perspective views, respectively during and following final assembly of one or more of the clips on an outlet box wall.
Figure 7:
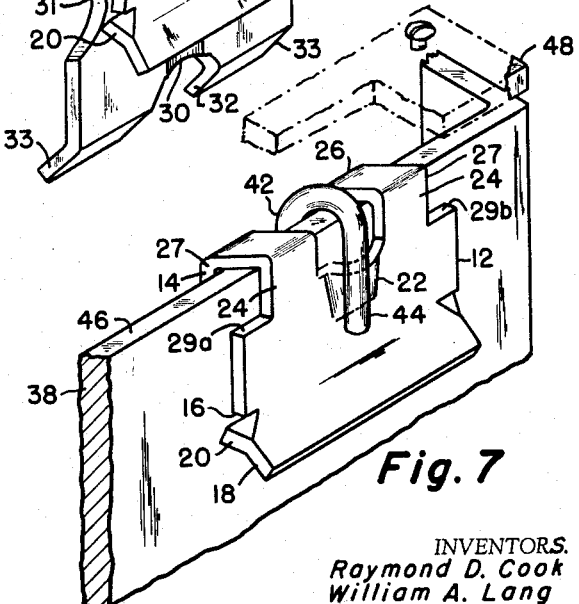

FIGURES 6 and 7 show a portion of the wall 38 of an outlet box or switch box provided with the usual lead-in opening and receiving a conventional electric cable 40 having multiple conductors comprising supply and ground-return circuit wires and including the bare length of a third or ground wire 42. In installation, the clip 10 is placed on the ground wire 42 with the free terminal 44 of the latter passing through the slot 32, between the corrugations 22 and 30, and through the opening 36 defined by the slot 28 (FIGURE 4); the wire is previously cropped off no closer than will allow the terminal portion 44 to extend ½″ or more beyond the face of the box and the clip slides down the wire so as to be placed over an edge 46 of the box wall 38, as shown in FIGURE 6. With the wire 42 temporarily pressed against and parallel with the side 38 and normal to the edge 46, the clip 10 is gripped adjacent the abutments presented by opposed ones of the tool shoulders indicated and forced over the edge 46 with a pair of pliers or with a special tool until it is tight against that edge 46, as shown in FIGURE 7. The excess terminal 44 can be cut off but in practice is preferably bent around the edge of the box, and then a conventional finish plate or other cover member 48, as appropriate, can be secured across the open end of the box by fasteners in the desired way.

Figures 2, 3:
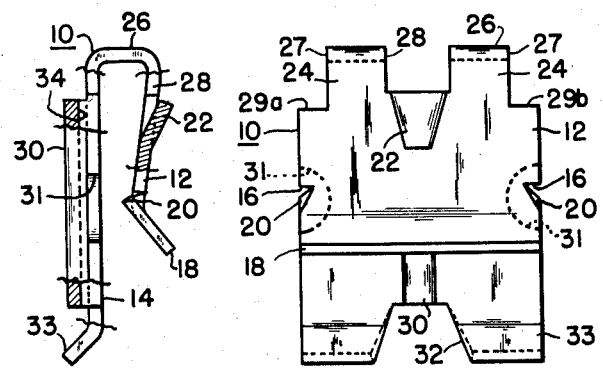
FIGURES 1, 2 and 3 are front, side, and rear views of a clip made according to our invention.
Figure 1:
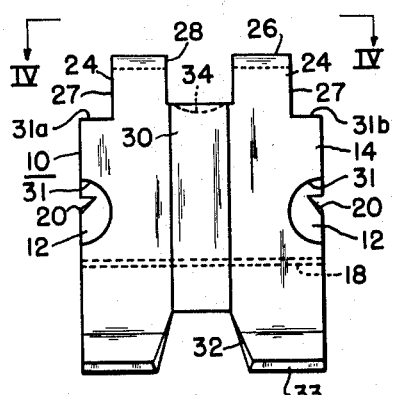
Figure 5:
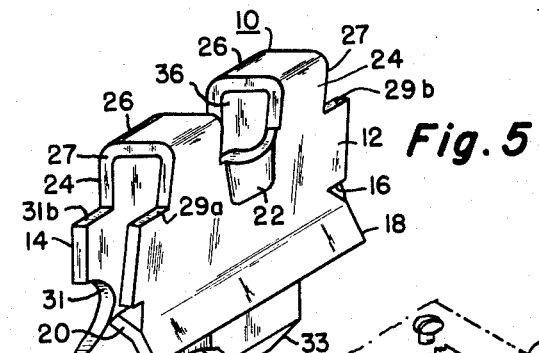
FIGURE 5 is a perspective view of the clip.

Following is an example of the dimensions of a clip 10 suitable for No. 14 or No. 16 solid copper wire:

Spring metal thickness of clip 10—0.028″
Width of legs 12 and 14—15/32″
Overall length of clip—39/64″
Distance which corrugation 30 is pressed outwardly—0.040″
Height of burr 34—0.008″
Diagonal angularity of ramps 18 and 33—45°
Normally spaced distance between legs 12 and 14—0.050″
Nominal distance between leg 14 and points 20—0.027″
Length of corrugation 30—13/32″
Length to diam. ratio, corrugation 30—6.25:1
Wire diameter—0.051-.064″
Box side 38, 14 gauge—0.078″ thick
Gap between confronting portions 14 and 18 at widest point—0.115″
Zinc plate over spring steel—0.001″ thick To enable the legs 12 and 14 in their free state to retain the specific attitude of FIGURE 2 requires that the spring arms 24 be initially over-bent somewhat at their right angle junctions such that, following the spring back natural with bent metal, the legs will take the desired angularity to the center section 26 and thereafter stay close together. For practical reasons during manufacture therefore, a strip of the flat spring metal stock must first, among other things, be relieved by notches 31 at proper points in the margin and also sheared at 16 and turned to provide the sharp points 20 which in their location occur substantially equal distances away from the center section 26 but in the opposite direction from the relieved points in developed view. Thereafter, when the strip is folded between its ends so as to form the bends adjacent its center section 26, the relieved points in the margin of the strip readily accommodate the sharp points 20, which, even though they protrude inwardly, are not confronted with a metal surface with which to register and become blunted. The extent to which the clip can be over-bent is thus materially increased and without danger of harming the points 20. Among other benefits due to the resulting closeness of the legs (0.050″), it has been found that the reentrant-angled or "knee" portion of the attachment leg 12 keeps each clip from nesting with others, i.e., becoming entangled in the gaps between their legs, when they are commingled for plating or bulk handling.

Inasmuch as the box wall 38 is thicker than the normally spaced distance between the legs 12 and 14 and inasmuch as the wire 42 is thicker than the distance to which the corrugation 30 is pressed outwardly, there is a substantial clamping pressure which develops directly at the interface of engagement between the wire and the wall. The barb points 20 digging into the opposite side of the wall of the box, due to the fact that they are laterally spaced relative to one another in a line parallel to the edge 46 of the latter, make it practically impossible, without use of a tool, to remove the clip 10 after it has been forced into place. The pressure point exerted by the grip of the burr 34 against the wire 42 (FIGURE 6) is equally important and for an additional reason, i.e., as a means essential to reducing resistance to current flow at the resulting electrical joint grounding the box at its wall 38. As a consequence, the present interengaged joint shows a voltage drop well below the perscribed standard previously indicated, and the reverse-motion-preventing points 20 and burr 34 impart a character of permanence to that joint.

It is apparent that the outwardly spread ramps 18 and 33 facilitate the installation of the clip in spite of the natural spring action of the arms 24 and the legs 12 and 14. The length of the corrugation 30 measures several times the value of the inside diameter of the semicylindrical saddle which it forms and consequently there is a considerable length of straight wire involved running in bare contact from end to end of the saddle portion and necessarily at right angles to the wall edge 46. It is further apparent that, as against opposite sides of the flat wall 38, the line contact of the straight length of wire and the line of points 20 are in mutually perpendicular planes in a balanced geometrical arrangement whereby the intersection of the wire with a transverse plane through the latter line of points substantially bisects the straight wire portion between opposite ends of the corrugation 30 and extending from the burr point 34. At and beyond that point, the conical corrugation 22 and the opening 36 formed by the slot 28 at the corresponding end of the saddle accommodate the extending terminal wire at that end which protrudes therefrom and of which, if the wire is left untrimmed, the bent excess can stay lodged in the gap between the spring arms 24 in the manner of portion 44.

While we have described certain presently preferred embodiments of our invention, it is to be understood that it may be otherwise embodied within the scope of the appended claims.

We claim:

1. A frictionally secured quick attachment connection for clamping parts together comprising the combination of an electrical part having a metal wall which is smooth adjacent one edge, a grounding part terminating in a length of bare wire disposed alongside said wall, and a frictionally held clip for clamping the bare wire adjacent the edge of the wall and having collateral legs forced into straddling engagement upon the wall with one leg arranged with a saddle portion riding on said length of wire, the maximum depth within said saddle portion being less than the wire thickness, there being tool-engaging shoulders on said clip and a sharp-cornered point in at least one of the ends of said saddle portion and imbedded in the length of wire, and a pair of points on another leg of said clip digging into a side of the wall, said pair providing a line of pressure points which are laterally spaced with respect to one another in an arrangement whereby the intersection of said wire with a transverse plane through the latter line of points substantially bisects the clamped length of that wire which is located between the ends of said saddle portion and extending from said sharp-cornered point.

2. A frictionally secured quick attachment connection for clamping parts together comprising the combination of an electrical part having a metal wall which is relatively smooth adjacent one edge, a grounding part terminating in a length of bare wire juxtaposed side by side to said wall, and a frictionally held, spring-metal clip for clamping the bare wire in the desired manner adjacent the edge of the wall, said clip having a pair of collateral legs normally spaced apart less than the thickness of said wall and movable into straddling engagement upon the wall, one leg arranged to ride on said length of wire with a saddle portion thereon pressed outwardly a distance which when added to said normal space between the legs is less than the combined thicknesses of said wire and said juxtaposed wall so that the natural spring elasticity develops clamping pressure at the interface of engagement between the wire and the wall, the saddle portion being thereby arranged in a continuous line of engagement with the wire between the opposite ends of the former and with a burr in at least one of those ends digging into the wire at that end, there being a pair of points on another leg in a balanced geometrical arrangement with said line of engagement and digging into a side of said wall.

3. For use with a three-conductor cable, electrical enclosure means provided with a lead-in opening means by which the terminal portion of such cable is lead into the enclosure means, said enclosure means comprising the combination of a box, a cover member arranged across an outside end of the box with its edges overlapped with the edges of the wall members of the box at that end, and a one-piece clip for grounding the third wire and which for its major portion is confined within said box, said clip being formed of spring steel material in a U-shape for straddling one of the overlapped edges between the corner member and an adjacent wall member, one of the legs of said U-shaped clip having a corrugation pressed outwardly therein, said clip having a slot formed therein so as to separate the juncture between the opposite legs into a pair of spring arms therebetween, said clip slot and said corrugation complementing one another as viewed in end elevation to define a wire aperture for insertion of a captive length of the third wire retained in alignment therebetween and in confinement within said corrugation and between said spring arms.

4. Electrical enclosure means comprising the combination of claim 3 wherein said corrugation is burred on the inside so as to imbed into the surface of the third wire.

References Cited in the file of this patent
UNITED STATES PATENTS

| | | |
|---|---|---|
| 516,291 | Aylworth et al. | Mar. 13, 1894 |
| 1,533,936 | Martin-Harvey | Apr. 14, 1925 |
| 2,148,848 | Wiley | Feb. 28, 1939 |
| 2,244,427 | Miller | June 3, 1941 |
| 2,652,620 | Sutowski | Sept. 22, 1953 |
| 2,684,994 | Kwake | July 27, 1954 |
| 2,715,714 | Pavlinetz | Aug. 16, 1955 |
| 2,768,232 | Kwake | Oct. 23, 1956 |
| 2,918,712 | Fernberg | Dec. 24, 1959 |
| 2,974,383 | Bright | Mar. 14, 1961 |

FOREIGN PATENTS

| | | |
|---|---|---|
| 195,762 | Great Britain | Apr. 9, 1923 |
| 686,238 | Great Britain | Jan. 21, 1953 |